United States Patent
James et al.

(10) Patent No.: US 11,361,383 B1
(45) Date of Patent: Jun. 14, 2022

(54) SIMPLIFIED INTERACTIVE USER INTERFACE

(71) Applicant: United Services Automobile Association (USAA), San Antonio, TX (US)

(72) Inventors: David James, San Antonio, TX (US); Irvin Lee Smith, San Antonio, TX (US); D'André Nepoleon Covin, San Antonio, TX (US); David John Pflug, San Antonio, TX (US); Elisabeth Rose Gutierrez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 192 days.

(21) Appl. No.: 16/123,082

(22) Filed: Sep. 6, 2018

Related U.S. Application Data

(60) Provisional application No. 62/554,810, filed on Sep. 6, 2017.

(51) Int. Cl.
*G06Q 40/08* (2012.01)
*G06Q 30/00* (2012.01)

(52) U.S. Cl.
CPC ......... *G06Q 40/08* (2013.01); *G06Q 30/016* (2013.01)

(58) Field of Classification Search
CPC .............................. G06Q 40/08; G06Q 30/016
See application file for complete search history.

(56) References Cited

U.S. PATENT DOCUMENTS 9,721,302 B2 * 8/2017 Tofte ...................... G06Q 40/08
10,102,587 B1 * 10/2018 Potter .................... G08B 21/02
(Continued)

FOREIGN PATENT DOCUMENTS

WO WO-2013072867 * 3/2013

OTHER PUBLICATIONS

Dupuy, Sylvain et al. "Generating a 3D Simulation of a Car Accident from a Written Description in Natural Language: the CarSim System," TASIP '01: Proceedings of the Workshop on Temporal and Spatial Information Processing, vol. 13, Association for Computational Linguistics (Jul. 7, 2001) (Year: 2001).*

*Primary Examiner* — Elizabeth H Rosen
(74) *Attorney, Agent, or Firm* — Fish & Richardson P.C.

(57) ABSTRACT

Techniques for cooperative document generation include methods, one of the methods includes receiving, from a mobile device, a request to start an insurance claim, the mobile device including an application configured to guide the user through the claim process. The method includes establishing a session between a computer and the mobile device. The method includes displaying images of the user interface of the mobile device. The method includes receiving information concerning the insurance claim from the mobile device, the information provided by the user in response to prompts provided on the mobile device. The method includes displaying the information on the computer. The method includes enabling the customer service representative to alter the information or request additional information be provided. The method includes adding the information to a data record regarding the insurance claim in response to an indication that the customer service representative has verified the information.

18 Claims, 13 Drawing Sheets

(56) References Cited

U.S. PATENT DOCUMENTS

| | | | |
|---|---|---|---|
| 10,360,634 B2* | 7/2019 | Lekas | G06Q 40/08 |
| 10,452,769 B1* | 10/2019 | Benavidez | H04L 41/22 |
| 10,803,527 B1* | 10/2020 | Zankat | G06V 20/59 |
| 10,902,525 B2* | 1/2021 | Kelsh | G06Q 50/22 |
| 2007/0198596 A1* | 8/2007 | DiRienzo | G06F 3/0481 |
| 2012/0087551 A1* | 4/2012 | Bhagwan | G06K 9/00255 |
| | | | 382/118 |
| 2012/0254716 A1* | 10/2012 | Choi | H04N 21/84 |
| | | | 715/230 |
| 2013/0297353 A1* | 11/2013 | Strange | G06Q 40/08 |
| | | | 705/4 |
| 2015/0316473 A1* | 11/2015 | Kester | G01N 21/3504 |
| | | | 250/339.02 |
| 2015/0356081 A1* | 12/2015 | Cronin | H04N 1/2125 |
| | | | 348/231.3 |
| 2016/0029145 A1* | 1/2016 | Angiolillo | G06Q 30/0203 |
| | | | 455/418 |
| 2017/0019356 A1* | 1/2017 | Gilbert | H04L 51/04 |
| 2017/0053250 A1* | 2/2017 | Bowers | G07F 17/24 |
| 2019/0034905 A1* | 1/2019 | Schlesinger | G06Q 20/24 |

\* cited by examiner

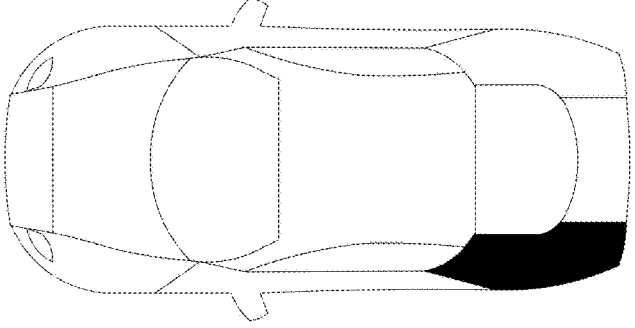

FIG. 16

Tabs: VoIP Responses & Member Validation | Send Push Notification | Onboarding | Accident Details | Claimant Vehicle Info | Claimant Driver Info | Claimant Vehicle Damage

PREVIEW

Accident Details

INSTRUCTIONS
Help the member select the type of collision and the approximate location of the accident.

— 1602

*Mobile screen 1:* ✉ ⚡ 12:30 — × Accident Details — Can You describe the type of collision? — Rear Ended | Backed into | Hit and Run | Failure to Yield | Other — Next

*Mobile screen 2 (1604):* ✉ ⚡ 12:30 — × Accident Details — Is this where the accident occurred? — Search or drag pin — [map] — Next

INPUTS

Type of Collision

1608 — Verbal Instructions:
Select the type of collision that best matches the incident that occurred. If you would like an example or description of the options I'd be glad to help.

1610 — Type of Collision
Rear Ended

Location of Accident

1612 — Verbal Instructions:
We geo located your device to the current location. Does this match the location of the incident? (If it doesn't)
Can you search the location or drag the pin to the approximate location of the incident?

1614 — Location of Accident
11428 Meadow Creek Ln
San Antonio, TX 78240

Next

— 1600

SIMPLIFIED INTERACTIVE USER INTERFACE

CROSS-REFERENCE TO RELATED APPLICATION

This application claims priority to U.S. Provisional Patent Application Ser. No. 62/554,810, filed on Sep. 6, 2017, the entirety of which is incorporated by reference into the present disclosure.

BACKGROUND

An insurance claim is a formal request to an insurance company asking for a payment based on the terms of the insurance policy. The insurance company reviews the claim for its validity and then pays out to the insured or requesting party (on behalf of the insured) once approved. As placing a claim presupposes that the insured as experiences a loss, frequently the circumstances surrounding placing a claim are stressful. Further, for particular individuals losses are relatively rare, a person may (and typically do) go years between claims. Therefore, during this period of relatively high stress the individual needs to engage in a process with which they are fundamentally unfamiliar. It is easy for the individual to make mistakes, get frustrated, and potentially abandon the process only to attempt to pick it up later.

SUMMARY

In general, innovative aspects of the subject matter described in this specification can be embodied in methods that includes act of receiving, from a mobile device, a request to start an insurance claim, the mobile device including an application configured to guide the user through the claim process. The methods include the act of triggering a push notification from the customer service representative's system to the member's mobile device to establish a session between a computer of a customer service representative and the mobile device. The method includes the act of displaying, on the computer, images of the user interface of the mobile device. The method includes the act of receiving information concerning the insurance claim from the mobile device, the information provided by the user in response to prompts provided on the mobile device. The method includes the act of displaying the information on the computer. The method includes the act of enabling the customer service representative to alter the information or request additional information be provided. The method includes enabling the customer service representative to enter information that is more easily entered through a keyboard. The method also includes the act of adding the information to a data record regarding the insurance claim in response to an indication that the customer service representative has completed the initial claim? The method includes the ability to use the application in tandem with a phone call, allowing the customer service representative to talk the user through the process.

Implementations can optionally include one or more of the following features. Receiving information may include receiving information from a camera on the mobile device. The application may include guides displayed on the user interface that indicate where the user should center a focus of the image. The application may use object recognition to acquire data from the images taken by the user. The computer of the customer service representative may receive information from the mobile device in response to a specific action taken with the mobile device. The computer of the customer service representative may receive information from the mobile device on a periodic basis. The application may enable the customer service representative to ask the user of the mobile device to provide additional information.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Data may be more accurately provided allowing for a more efficient process. Processing may be improved. A customers experience may be improved.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2-11 illustrate screens for a mobile application to submit an insurance claim.

FIGS. 12-16 illustrate user interfaces that enable a customer service representative to interact with a customer placing an insurance claim.

DETAILED DESCRIPTION

An insurance claim is a formal request to an insurance company asking for a payment based on the terms of the insurance policy. The insurance company reviews the claim for its validity and then pays out to the insured or requesting party (on behalf of the insured) once approved. As placing a claim presupposes that the insured as experiences a loss, frequently the circumstances surrounding placing a claim are stressful. Further, for particular individuals losses are relatively rare, a person may (and typically do) go years between claims. Therefore, during this period of relatively high stress the individual needs to engage in a process with which they are fundamentally unfamiliar. It is easy for the individual to make mistakes, get frustrated, and potentially abandon the process only to attempt to pick it up later.

Traditional systems have difficulty managing claims that are started, but not submitted. Frequently, an individual may be locked out of starting a new claim for a period of time (such as a day). To further compound issues, customer service representatives may not be able to access an abandoned claim for the same period of time. This leaves the individual little choice but to continue the claim later. Not only do these delays tie up computational resources (including, but not limited to, memory, disk storage, and CPU cycles), the resulting delays may lead to a loss of pertinent information as details may have been forgotten and the information may no longer be available, for example, for an auto insurance claim resulting from an accident the individual may no longer have access to information about the other vehicle (such as the vehicle identification number, license plate number, etc.) and the other driver (such as the driver's license number, insurance information, etc.).

To address these concerns and to streamline and make the claim process more efficient, a customer service representative may be able to interact with a mobile device possessed by the individual (or user) and the user in order to assist in making a claim.

Figure 1:
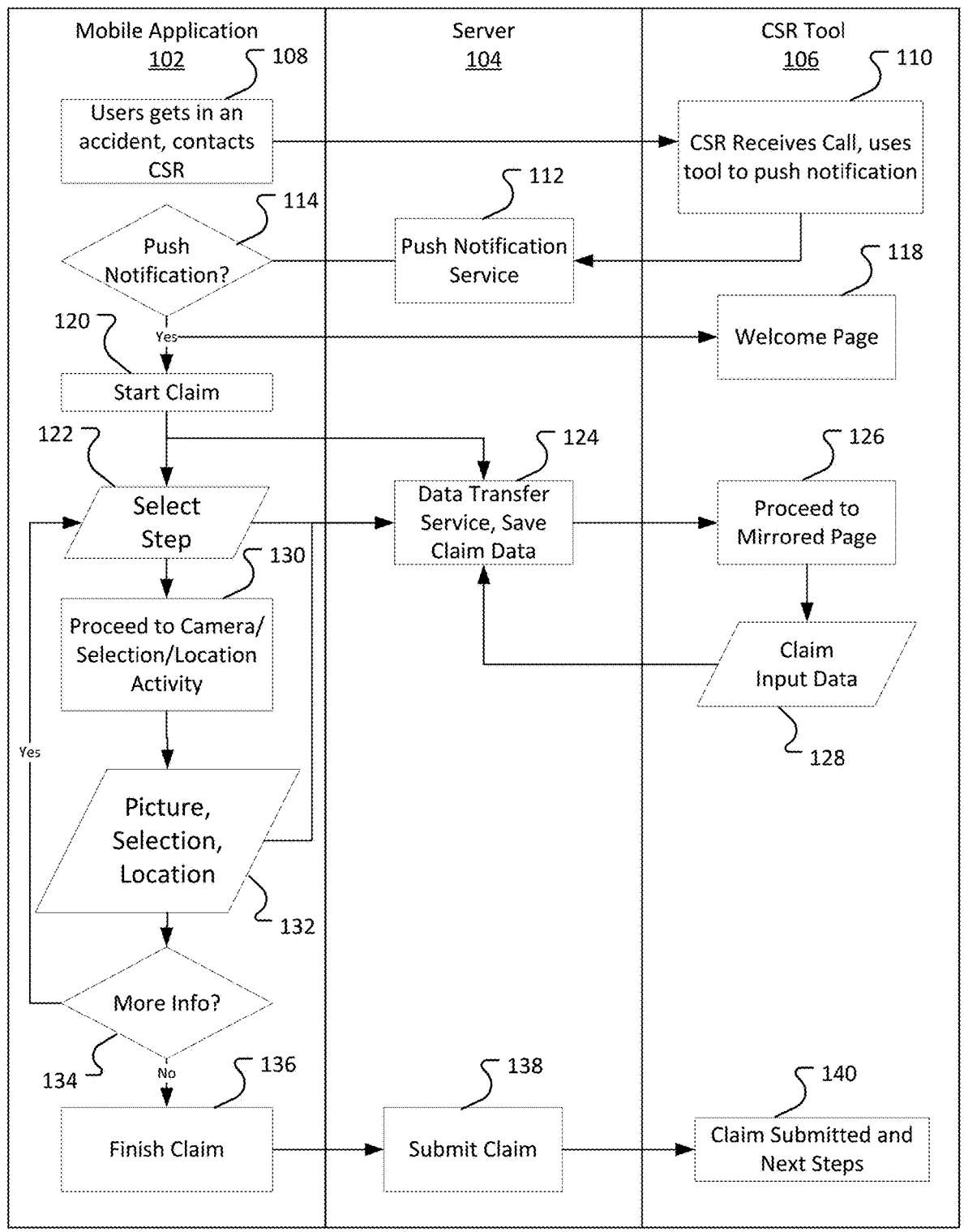
FIG. 1 is a flowchart of an example process for providing efficient claim submissions.

FIG. 1 is a flowchart of an example process for providing efficient claim submissions. The process is performed at least three disparate systems working together in concert, an application 102 installed on the mobile device of a user, an application or tool 106 installed on a computer of a customer service representative, and a server 104 which coordinates activities between the application installed on the mobile device and the application installed on the computer of the customer service representative. While this particular example is explained in terms of an auto insurance claim, the same process may apply to other kinds of insurance claims, for example, homeowner insurance claims, personal articles and fine arts claims, etc.

The process begins when the user gets into an accident. The user uses the mobile application 102 to contact 108 the Customer Service Representative (CSR) 106. The Customer Service Representative receives the call and uses the tool to send 110 a push notification to the user, the push notification signals to the mobile application 102 to start the information collection process.

The push notification may be sent to the mobile device of the user by a push notification service 112. The mobile application 102 receives the push notification 114. In some implementations, the user has the option of accepting the push notification and starting a claim 120. In some implementations, the mobile application 102 automatically starts the claim when the push notification is received 114. In response to either the push notification being sent or the mobile application 102 receiving the push notification, the customer service representative tool 102 directs the CSR to a welcome page. The welcome page serves as a placeholder and waits for additional information from the user.

While the user is collecting information, as described further below, the customer service representative may be maintaining a voice conversation with the user. The customer service representative may be giving the user advice or providing feedback on the information provided by the user.

The mobile application 102 starts a claim 120. When then mobile application 102 starts a claim 120 it informs a data transfer service 124. The data transfer service 124 saves claim data provided by either the mobile application 102 or the CSR tool 106. The data transfer service 124 also coordinates communication and screen "mirroring" between the mobile application 102 and the CSR tool 106. To completely mirror what is presented on a mobile device at every moment is both bandwidth and power intensive, and is therefore impracticable. For example, maintaining a continual stream of data between the mobile application and the CSR tool or Server would rapidly drain the battery of the mobile device executing the mobile application. Further, many users have data plans that limit their use of cellular bandwidth. Maintaining a continual stream of data may cause the mobile device to quickly reach a data cap associated with the mobile device.

Accordingly, the mobile application may selectively send images to the data transfer service. For example, the mobile application may send data when the user of the mobile device indicates that they are satisfied with the data (for example, satisfied with the picture they have taken.) Additionally, the mobile application may send a periodic snapshot of the user interface to the customer service representative (for example, one snap shot every 5 to 60 seconds).

The mobile application 102 allows the user to select which activity they want to do and in which order 130. In some implementations, completing the auto insurance claim requires taking pictures, providing general information about the accident, and providing the location of the accident.

As the user provides the information (pictures, selected info, and location information 132) through the mobile app and clicks "submit", the information is sent to the data transfer service 124. The information is presented on the CSR tool 106. The CSR may review the information and inform the user if the information is incomplete or otherwise inadequate (for example, if a photograph is too blurry). Once the CSR agrees that the provided information is satisfactory, the CSR adds the claim data 128 to the claim.

If the claim requires additional information 134 then the user is directed back to the selection step 122. Otherwise, the claim is finished 136. The mobile application 102 indicates to the server 104 that the claim is ready to be submitted 138. The server notifies the CSR that the claim is submitted 138 and directs the CSR to schedule next steps (for example, an appraisal).

Figures 2, 3:
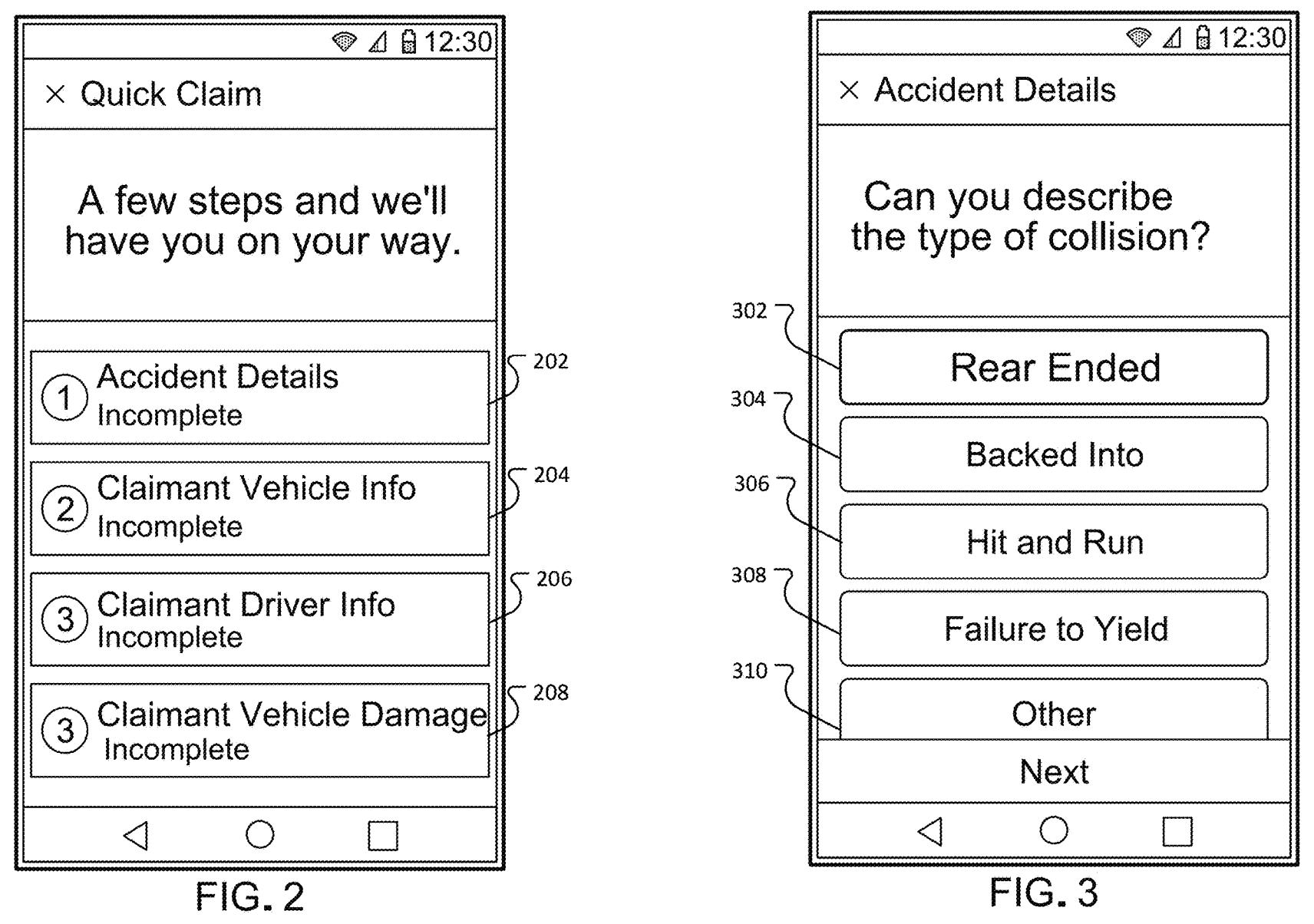

FIGS. 2-11 illustrate screens for a mobile application to submit an insurance claim. The mobile application may be executed, for example, by a smart phone or tablet device. The mobile application begins with an option to select which kind of information the user wish to provide. Referring to FIG. 2, the user may select between providing accident details 202, claimant vehicle information 204, claimant driver information 206, and the claimant vehicle damage 208.

Referring to FIG. 3, the user can provide details about the accident. The information about the accident can include, for example, the type of accident (in this example, rear ended 302, backed into 304, hit and run 306, failure to yield 308, or other 310). If the user selects other, in some implementations, the system enables the user to record a statement describing the accident. The recording may be processed using natural language processing and transcription techniques to produce a text version of the user's statement.

Figure 4:
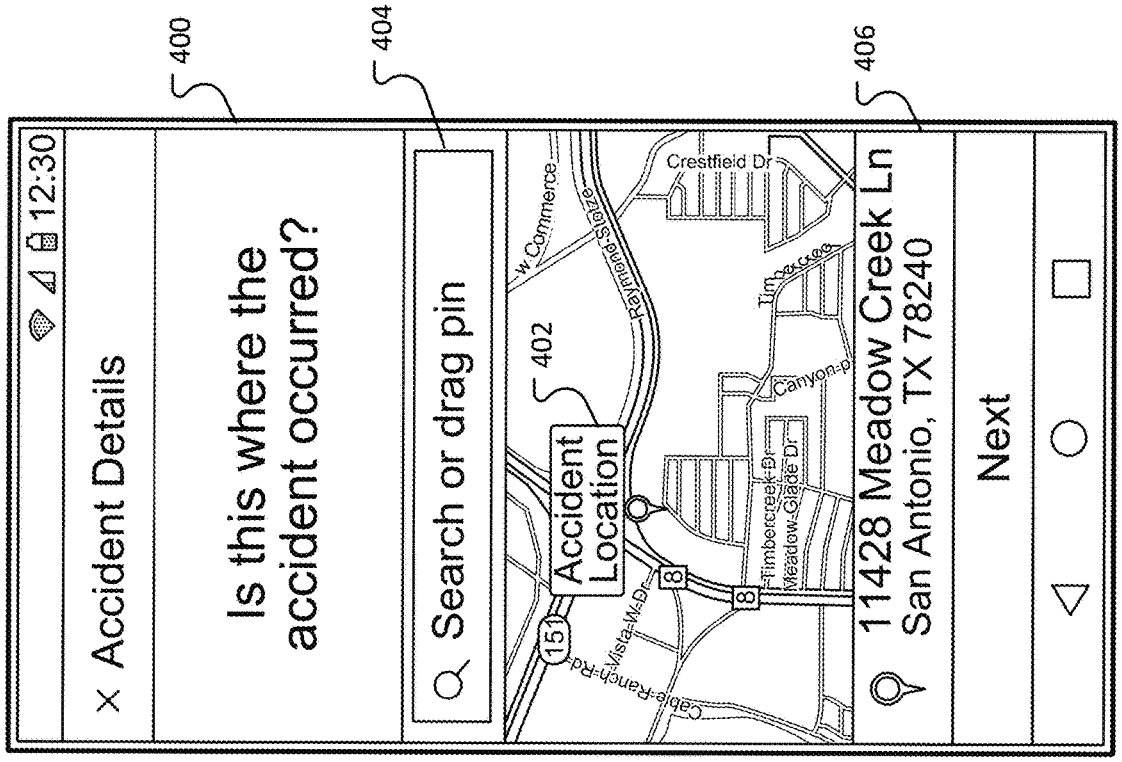

Referring to FIG. 4, the next user interface screen 400 enables the user to identify where the accident occurred. The mobile application may provide a default location based on the current location of the mobile device (as reported by a GPS device embedded in the mobile device). The user interface displays an icon at the presumed accident site 402.

The user is able to drag and drop the icon on a map to the location of the accident (as explained by the instructions 404) or type an address in a text field (404). Under the map the user interface may display the selected address 406 for easy confirmation.

Figure 5:
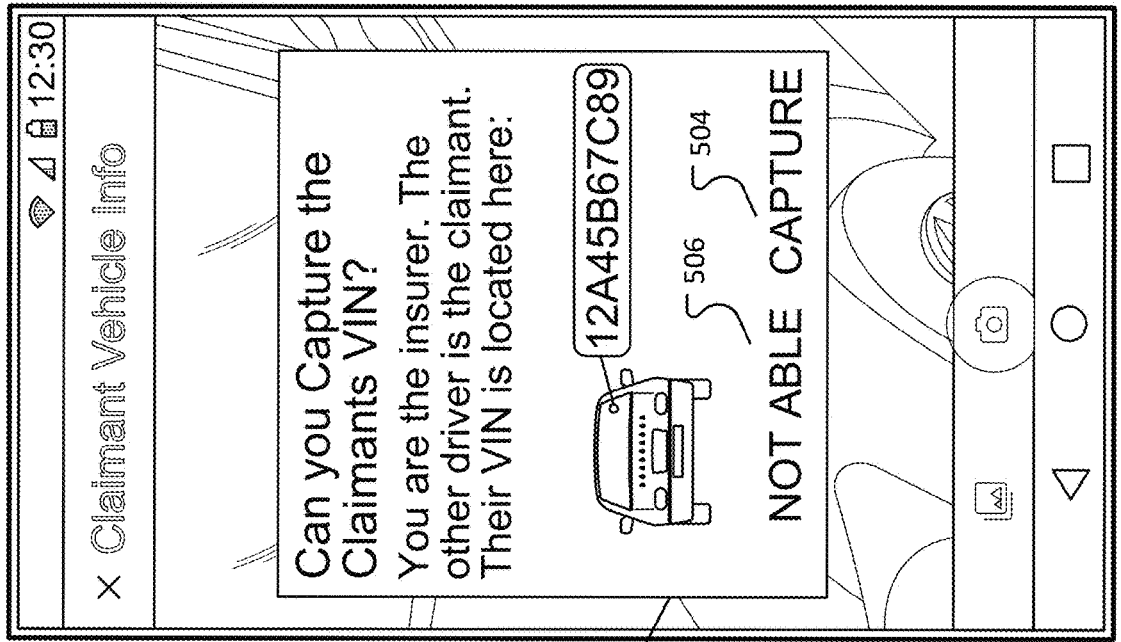
Figure 6:
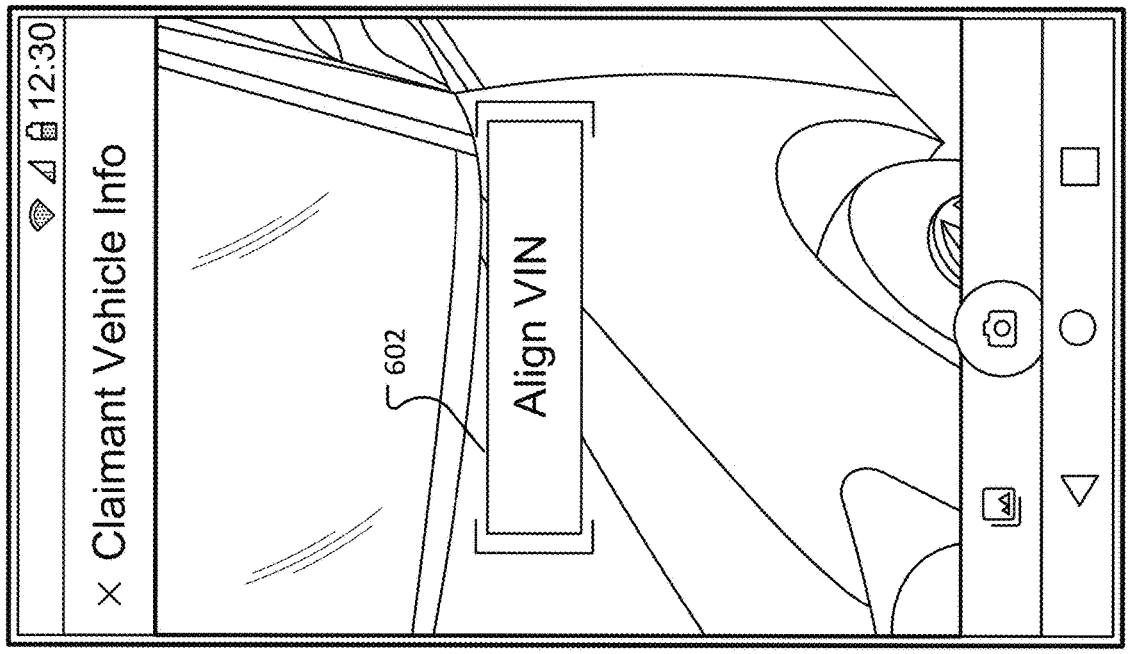

Referring to FIG. 5, a user interface 500 enables the user to take a picture of the VIN associated with the other party (referred to as the claimant.) The mobile application may display instruction 502 to the user. The user is able to either select an option to take a picture 504 or to indicate that the information is not available 506. In some situations, if the user has previously indicated that the information is not available (for example, if the accident was a hit and run) then the application may not ask about the other vehicle. If the user selects to capture the VIN, the mobile application accesses a camera on the mobile device. Referring to FIG. 6, the user is asked to take a picture of the VIN of the other vehicle. The user interface may include a guide 602 that provides queues to the user about how to center the camera and how close the camera should be (for example, so that the VIN fills the guides). Once the image is taken by the user, object recognition is used to determine the VIN value. As described above, the image and VIN value are then sent to the customer service representative. The customer service representative analyzes the picture and determines if the quality is sufficient for insurance claim purposes. If so, the picture and VIN are added to the claim.

Figure 7:
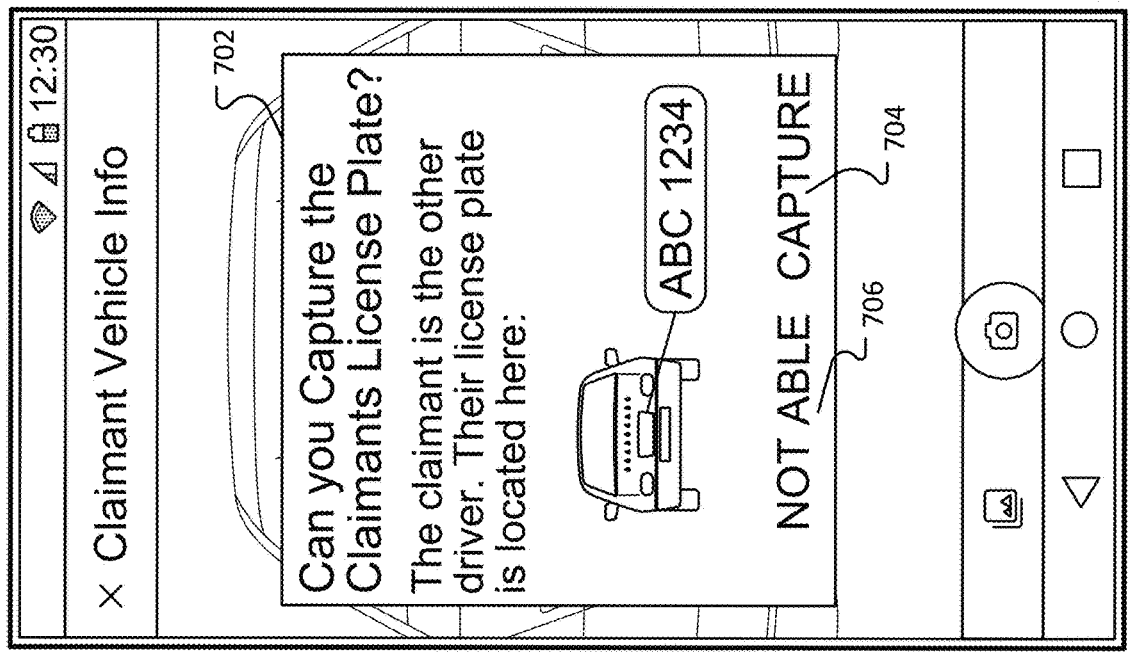
Figure 8:
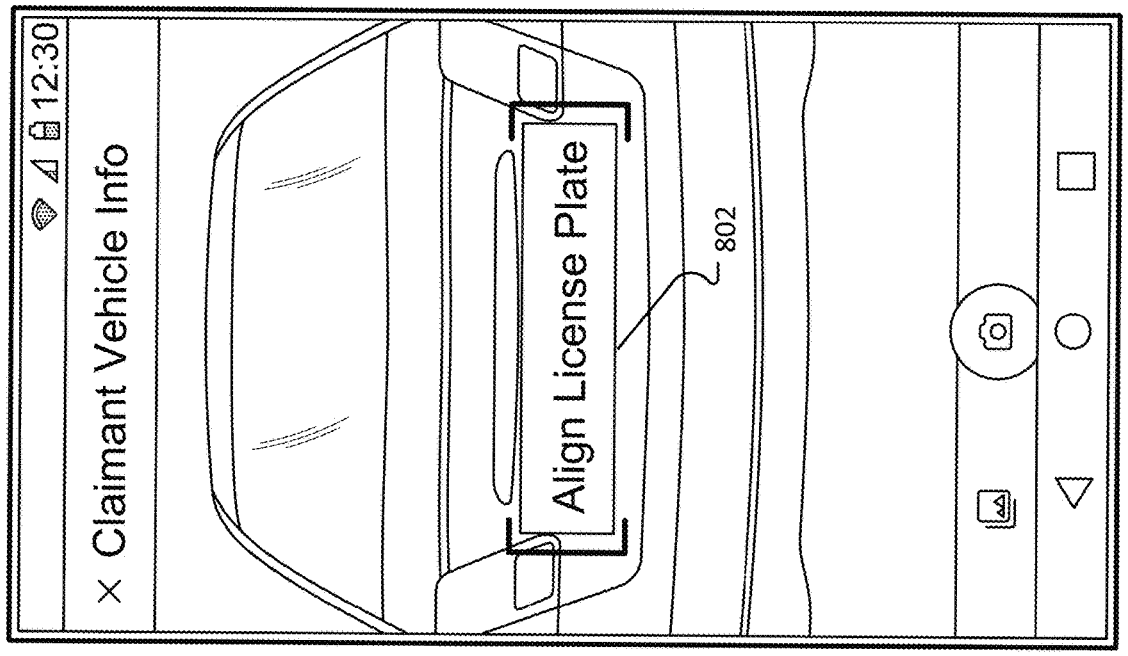

Referring to FIG. 7, a user interface 700 may also ask 702 the user to take a picture of the other vehicles license plate. As above, the user is able to select an option to take the picture 704 or to indicate that the information is not available 706. Referring to FIG. 8, if the user selects to capture the license plate, the mobile application accesses a camera on the mobile device. The user is asked to take a picture of the license plate of the other vehicle. The user interface may include a guide 802 that provides queues to the user about how to center the camera and how close the camera should be (for example, so that the license plate fills the guides). As described above, once the image it taken by the user, object recognition determines the license plate number, and sends the value and image to the customer service representative. The customer service representative analyzes the picture and determines if the quality is sufficient for insurance claim purposes. If so, the picture and license plate number are added to the claim.

Figure 9:
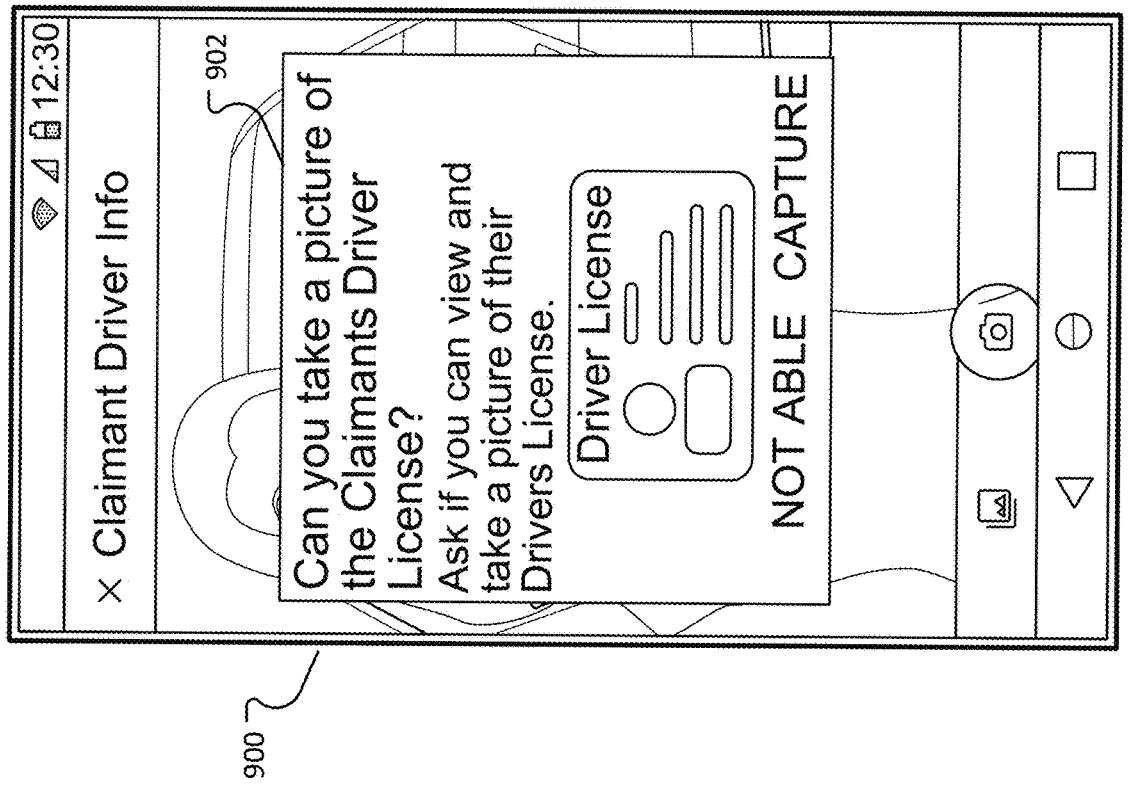

Referring to FIG. 9, a user interface 900 may similarly ask 902 the user to take a picture of the other drivers driver's license. As above, the user is able to select an option to take the picture or to indicate that the information is not available. As described above, once the image it taken by the user, object recognition collects the driver's name, driver's license number, etc. This data and the image are then sent to the customer service representative. The customer service representative analyzes the picture and determines if the quality is sufficient for insurance claim purposes. If so, the picture and data are added to the claim.

Referring to FIG. 10, a user interface 1000 may ask the user about the damage to the other vehicle. The user may select between different types of vehicles (for example, Car 1002, Truck 1004, SUV 1006, Other 1008). As above, if the user selects other the system may enable the user to provide a vocal statement in lieu of typing out the information.

Referring to FIG. 11, a user interface 1100 may ask 1102 the user to indicate where the claimant vehicle is damages. In this example, the user selects the damaged parts of the car based on the shading 1104. The user may select parts of the vehicle that have been damaged. For example, each of the sections separately selectable.

Once the user has selected a part of the vehicle that is damaged, the mobile application may ask the user to take a picture of that part of the vehicle. In other implementations, the mobile application may ask the user to take pictures of the vehicles from each angle and may provide guidance to assist them in doing so. As described above, once the image it taken by the user, it is sent to the customer service representative. The customer service representative analyzes the picture and determines if the quality is sufficient for insurance claim purposes. If so, the picture is added to the claim.

As described above, while the user is providing claim information, a customer service representative may be monitoring the claim process and interacting with the user to ensure that the information is captured correctly.

Figure 12:
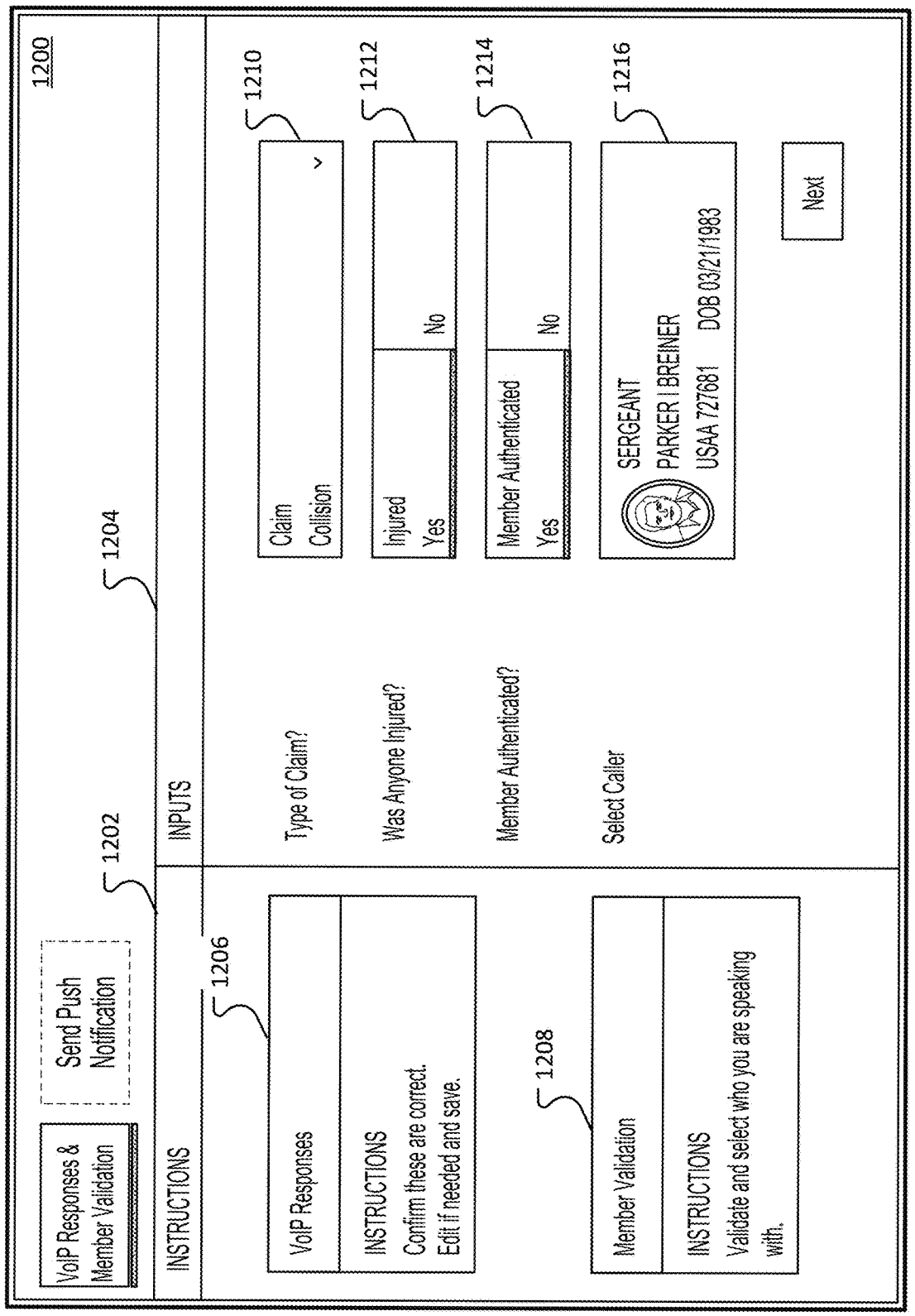

FIGS. 12-16 illustrate user interfaces that enable a customer service representative to interact with a customer placing an insurance claim. Referring to FIG. 12, a user interface 1200 presented to a customer service representative may include an instructions section 1202, the instructions may serve to remind and guide the customer service representative in the discussions with the customer. For example, the instructions to confirm responses and save 1206 and to validate the identity of the customer 1208.

The user interface 1200 may include an inputs 1204 area. The inputs area 1204 allows the customer service representative to provide information for the claims, for example, the type of claim 1210, whether an injury is involved 1212, whether the customer was authenticated 1214, and the identity of the caller 1216. In some implementations, the information in the inputs section may be provided by the customer, for example, by entering values into input fields on a client device.

Figure 13:
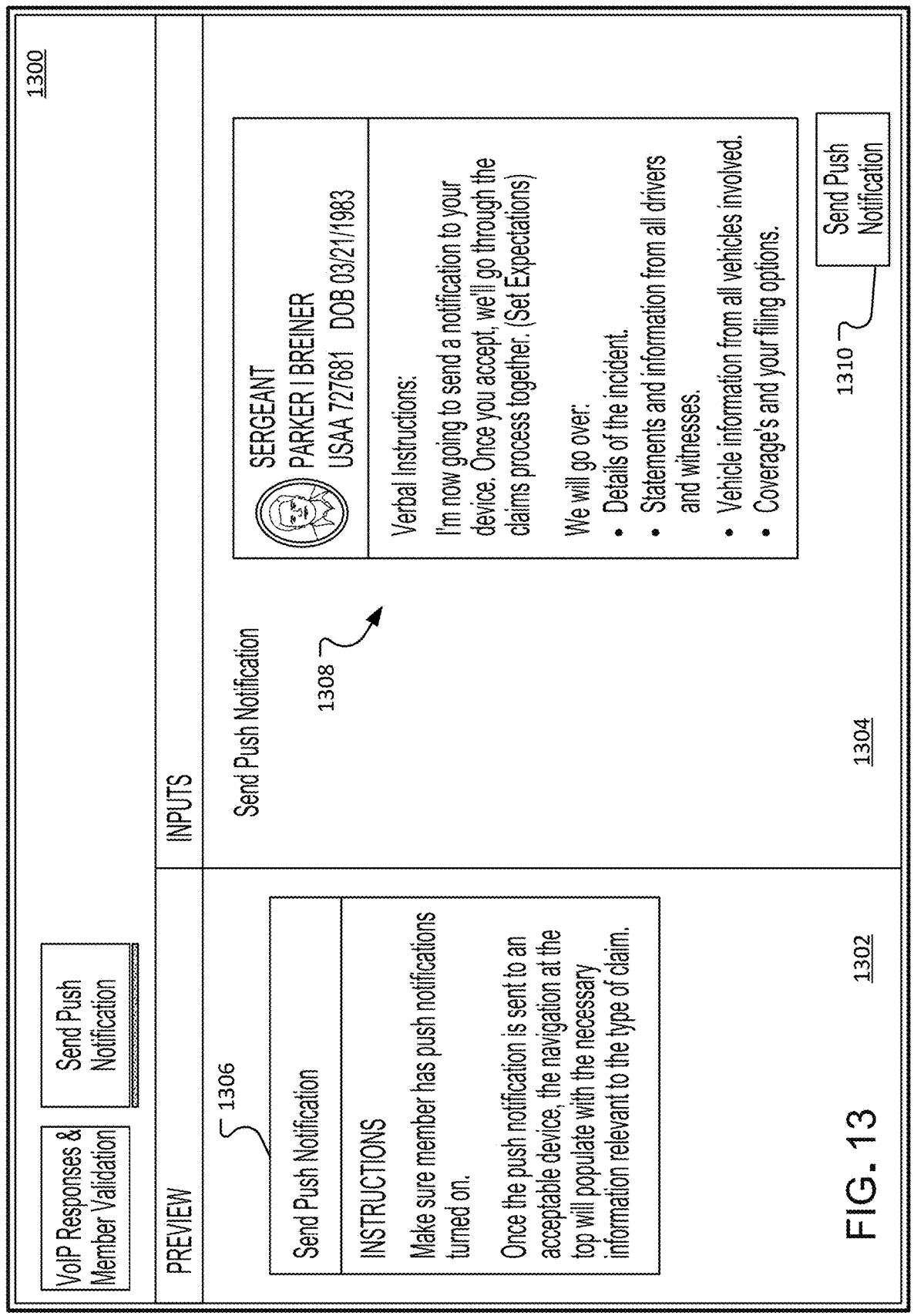

Referring to FIG. 13, a user interface 1300 may include an instructions section 1302 and an inputs section 1304. In this example, the user interface 1300 includes instructions 1306 which tell the customer service representative to make sure the customer's mobile device is capable of receiving push notifications. The input section 1304 includes instructions 1308 to send to the customer. The instructions 1308 are send to the customer when the customer service representative presses the send push notification button 1310.

Figure 14:
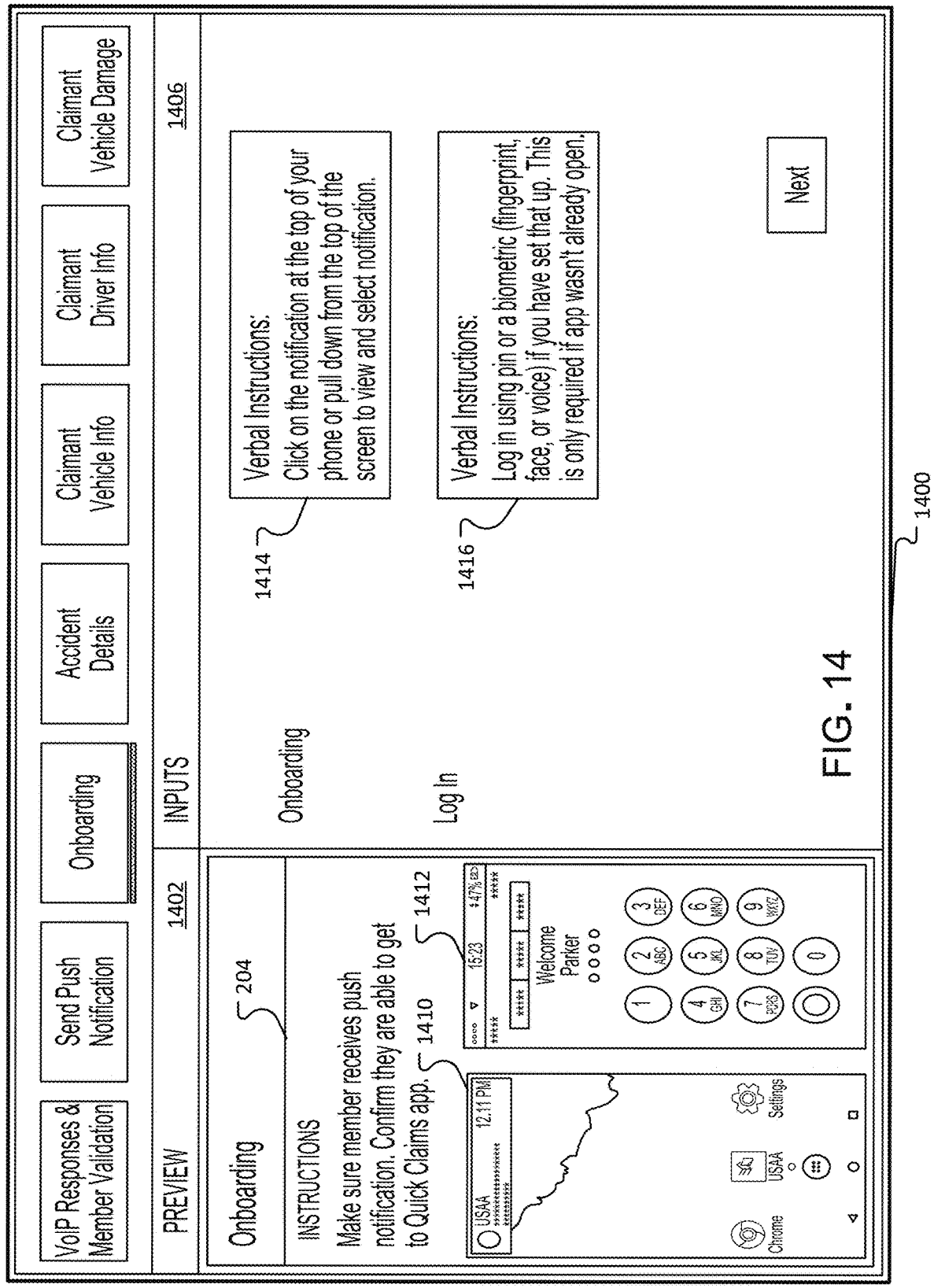

Referring to FIG. 14, a user interface 1400 includes a preview section 1402 and an inputs section 1406. The preview section 1402 may show images 1410 and 1412 of the customer's mobile device transmitted over a network. The images may be taken periodically or in response to a particular input by the customer. In this example, the image 1410 illustrates the screen of the customer's mobile device when the application is launched and when the user is presented with a login screen.

The user interface 1400 also include verbal instructions 1414 and 1416 to be communicated to the customer by the customer service representative.

The user interface 1400 also includes navigation buttons that allow the customer service representative to quickly navigate between sections of the application in this manner the customer service representative can be responsive to the process that the customer is most comfortable with and/or able to perform.

Figure 15:
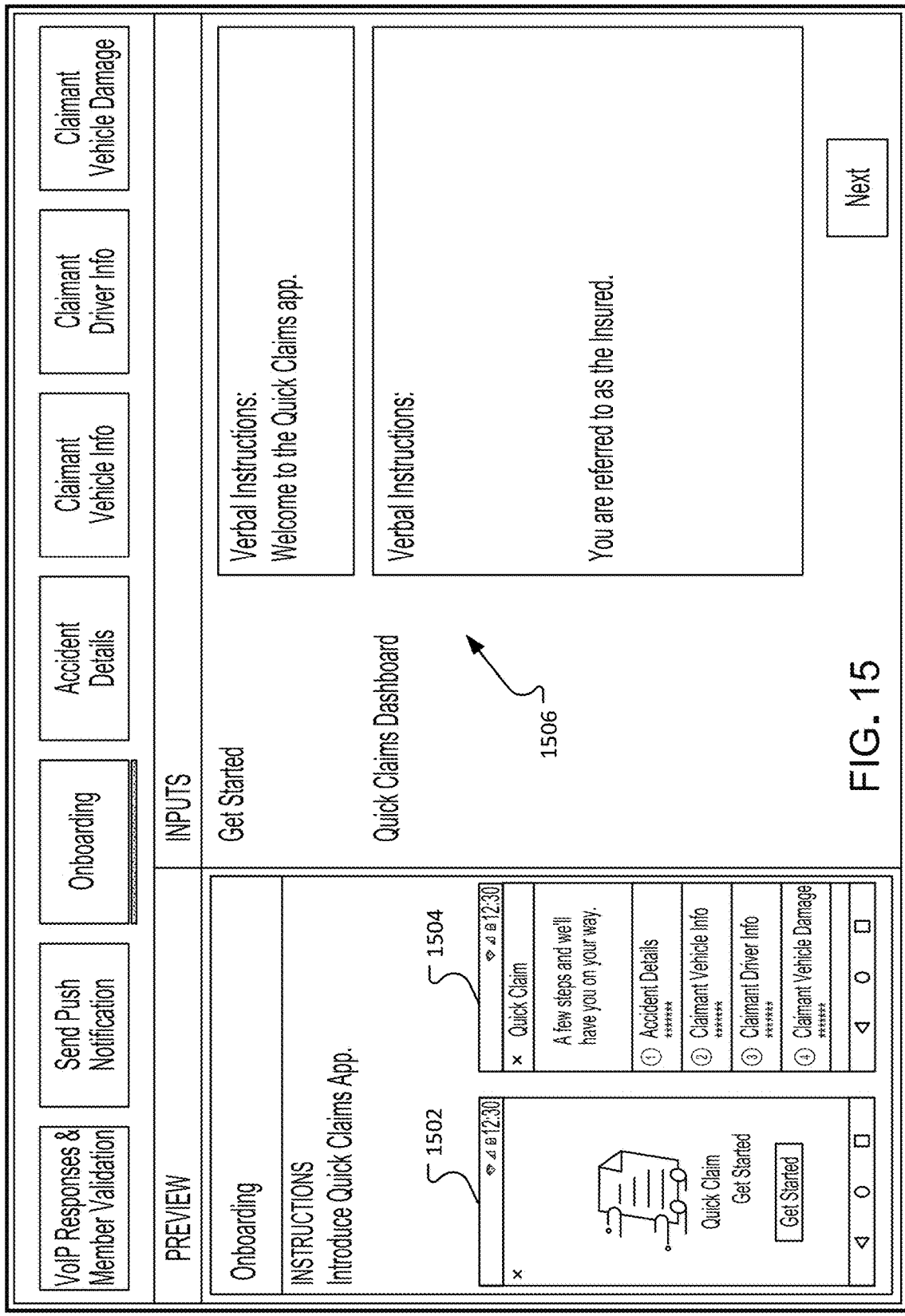

Referring to FIG. 15, an onboarding user interface 1500 includes a preview section that presents images 1502, 1504 from the customer's mobile device. For example, the image 1504 corresponds to the user interface illustrated in FIG. 2.

The user interface also includes verbal instructions 1506 that are communicated to the customer.

The application can also include user interface screens that correspond to the claimant vehicle information, claimant drive information, and claimant vehicle damage. Each of these screens can present images of the customer's mobile device as they provide the requested information (as illustrated by FIG. 5-8, FIG. 9, and FIGS. 10-11 respectively.)

Referring to FIG. 16 an accident detail user interface 1600. The accident detail user interface includes a preview section which includes images taken from the customer's mobile device as the customer navigates through the accident details process. In this example, the image 1602 corresponds to the user interface illustrated by FIG. 3, and the image 1604 corresponds to the user interface illustrated by FIG. 4. The accident details user interface 1600 also includes verbal instructions 1608, 1612 that can be provided to the user. The accident details user interface 1600 also includes input fields for the type of collision 1610 and the location of the accident 1614. The values for these input fields can be provided by the customer's mobile device and confirmed by the customer service representative.

Figure 17:
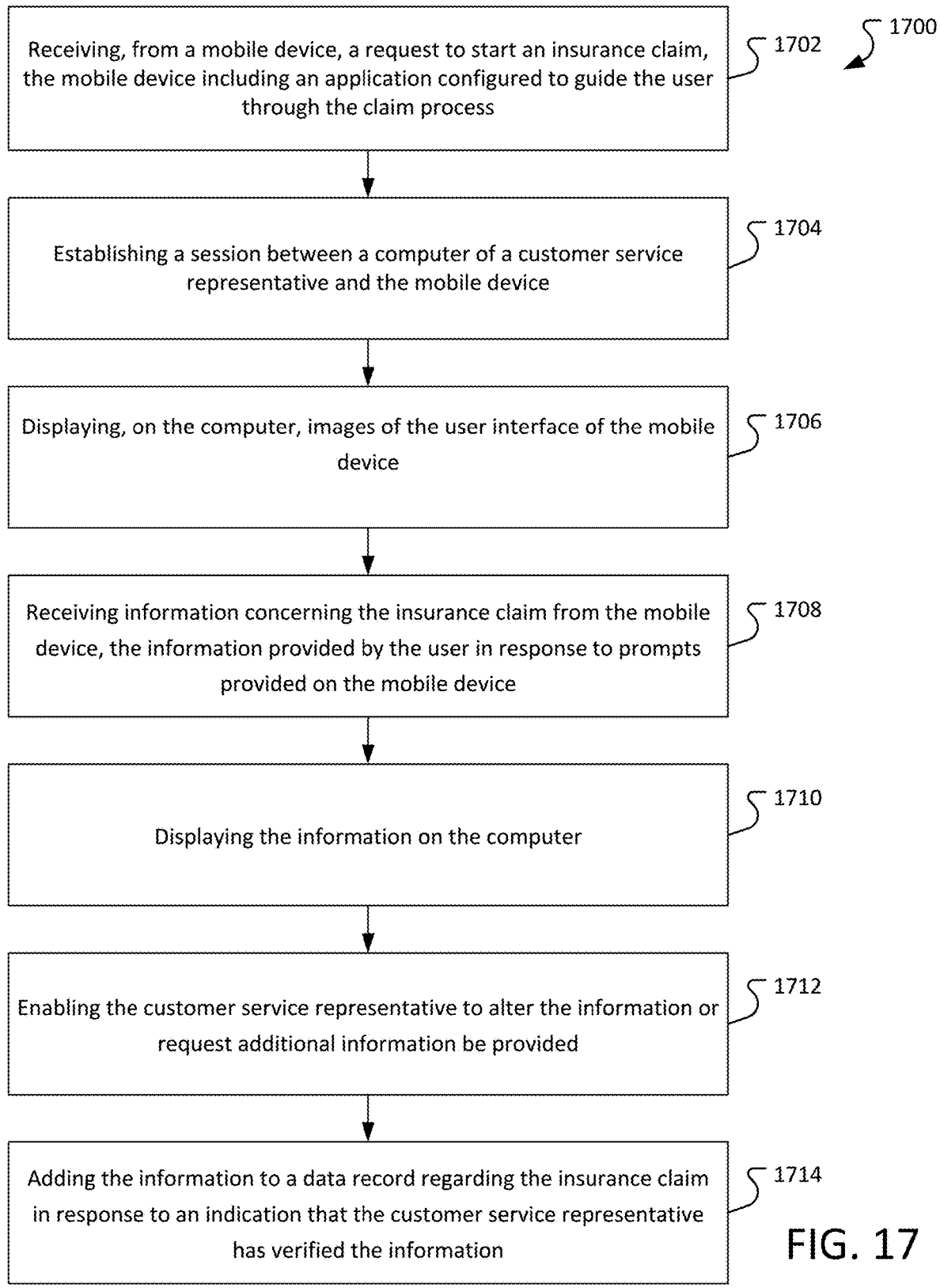
FIG. 17 is a flow chart of an example process for an interactive claim process.

FIG. 17 is a flow chart of an example process for an interactive claim process. The process may be performed, for example by the server 104 of FIG. 1 in conjunction with the mobile application 102.

The process 1700 receives 1702, from a mobile device, a request to start an insurance claim, the mobile device includes an application configured to guide the user through the claim process. The request may be received from an application executing on a mobile device, for example, an insurance app.

The process 1700 establishes 1704 a session between a computer of a customer service representative and the mobile device.

The process 1700 displays 1706, on the computer, images of the user interface of the mobile device.

The process 1700 receives 1708 information concerning the insurance claim from the mobile device, the information provided by the user in response to prompts provided on the mobile device.

The process 1700 displays 1710 the information on the computer.

The process 1700 enables 1712 the customer service representative to alter the information or request additional information be provided.

The process 1700 adds 1714 the information to a data record regarding the insurance claim in response to an indication that the customer service representative has verified the information.

Figure 18:
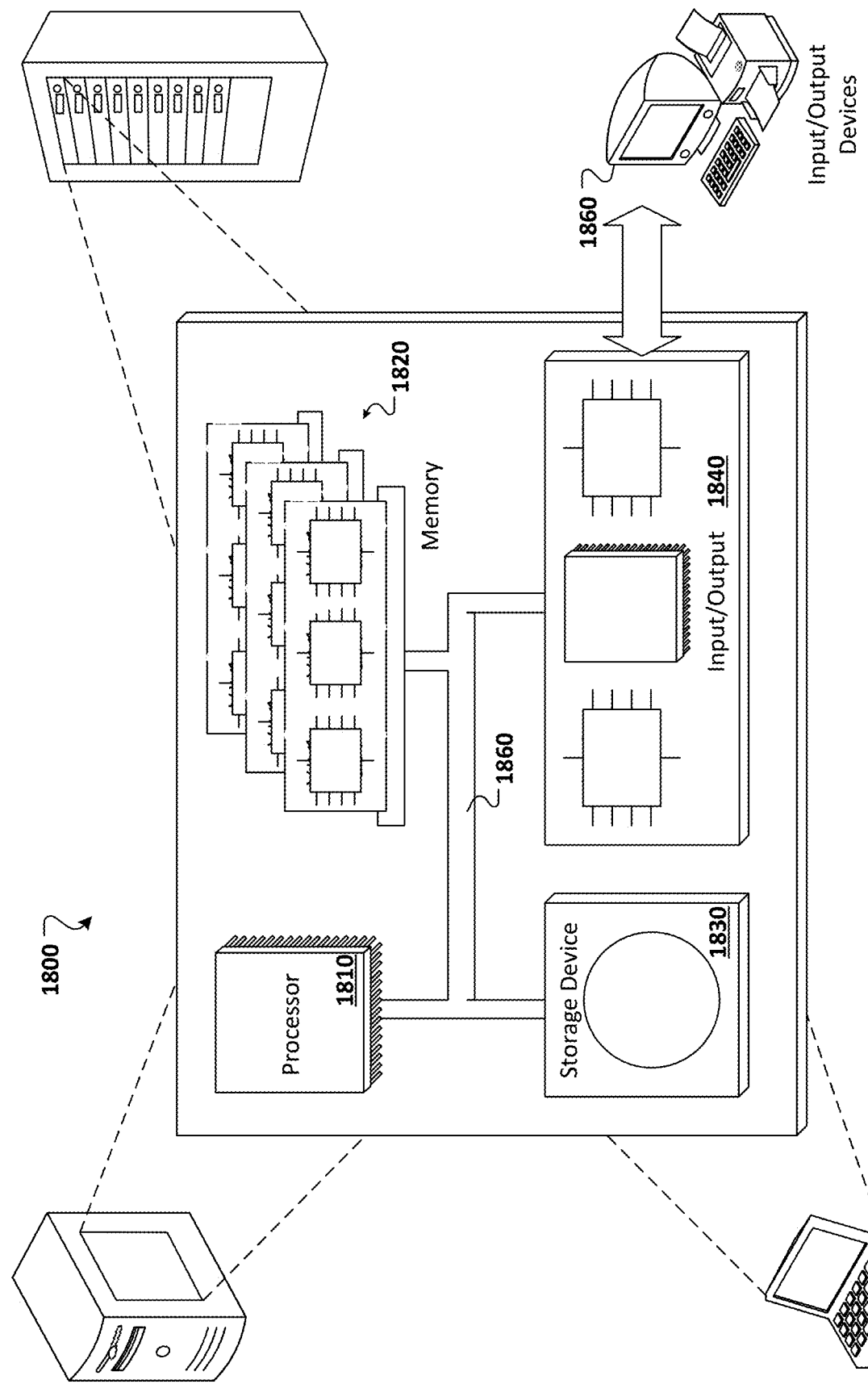
FIG. 18 depicts an example computing system, according to implementations of the present disclosure.

FIG. 18 depicts an example computing system, according to implementations of the present disclosure. The system 1800 may be used for any of the operations described with respect to the various implementations discussed herein. For example, the system 1800 may be included, at least in part, in one or more of the SR device 108, the analysis device(s) 114, and/or the user device 126, and/or other computing device(s) or system(s) described herein. The system 1800 may include one or more processors 1810, a memory 1820, one or more storage devices 1830, and one or more input/output (I/O) devices 1850 controllable through one or more I/O interfaces 1840. The various components 1810, 1820, 1830, 1840, or 1850 may be interconnected through at least one system bus 1860, which may enable the transfer of data between the various modules and components of the system 1800.

The processor(s) 1810 may be configured to process instructions for execution within the system 1800. The processor(s) 1810 may include single-threaded processor(s), multi-threaded processor(s), or both. The processor(s) 1810 may be configured to process instructions stored in the memory 1820 or on the storage device(s) 1830. The processor(s) 1810 may include hardware-based processor(s) each including one or more cores. The processor(s) 1810 may include general purpose processor(s), special purpose processor(s), or both.

The memory 1820 may store information within the system 1800. In some implementations, the memory 1820 includes one or more computer-readable media. The memory 1820 may include any number of volatile memory units, any number of non-volatile memory units, or both volatile and non-volatile memory units. The memory 1820 may include read-only memory, random access memory, or both. In some examples, the memory 1820 may be employed as active or physical memory by one or more executing software modules.

The storage device(s) 1830 may be configured to provide (e.g., persistent) mass storage for the system 1800. In some implementations, the storage device(s) 1830 may include one or more computer-readable media. For example, the storage device(s) 1830 may include a floppy disk device, a hard disk device, an optical disk device, or a tape device. The storage device(s) 1830 may include read-only memory, random access memory, or both. The storage device(s) 1830 may include one or more of an internal hard drive, an external hard drive, or a removable drive.

One or both of the memory 1820 or the storage device(s) 1830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1800. In some implementations, the CRSM may include a data store that provides storage of computer-readable instructions or other information in a non-transitory format. The CRSM may be incorporated into the system 1800 or may be external with respect to the system 1800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1810 and the memory 1820 may be supplemented by, or incorporated into, one or more application-specific integrated circuits (ASICs).

The system 1800 may include one or more I/O devices 1850. The I/O device(s) 1850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1850 may also include one or more output devices such as a display, LED(s), an audio output device (e.g., a speaker), a printer, a haptic output device, and so forth. The I/O device(s) 1850 may be physically incorporated in one or more computing devices of the system 1800, or may be external with respect to one or more computing devices of the system 1800.

The system 1800 may include one or more I/O interfaces 1840 to enable components or modules of the system 1800 to control, interface with, or otherwise communicate with the I/O device(s) 1850. The I/O interface(s) 1840 may enable information to be transferred in or out of the system 1800, or between components of the system 1800, through serial communication, parallel communication, or other types of communication. For example, the I/O interface(s) 1840 may comply with a version of the RS-232 standard for serial ports, or with a version of the IEEE 1284 standard for parallel ports. As another example, the I/O interface(s) 1840 may be configured to provide a connection over Universal Serial Bus (USB) or Ethernet. In some examples, the I/O interface(s) 1840 may be configured to provide a serial connection that is compliant with a version of the IEEE 1394 standard.

The I/O interface(s) 1840 may also include one or more network interfaces that enable communications between computing devices in the system 1800, or between the system 1800 and other network-connected computing systems. The network interface(s) may include one or more network interface controllers (NICs) or other types of transceiver devices configured to send and receive communications over one or more networks using any network protocol.

Computing devices of the system 1800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS)

receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    receiving, from a mobile device of a user, a request to start an insurance claim with respect to an accident, the mobile device including a mobile application configured to guide the user through the claim process;
    in response to receiving the request, sending a push notification to the mobile device, the push notification causing the mobile application to automatically start a process of collecting information for the insurance claim;
    in response to the mobile application automatically starting the process of collecting information for the insurance claim, establishing a live communications session between a computer of a customer service representative and the mobile device through the mobile application for collecting information for the insurance claim related to the accident;
    during the live communications session between the computer of the customer service representative and the mobile device of the user for collecting information for the insurance claim related to the accident:
        displaying, on the computer of the customer service representative, a plurality of images of the user interface of the mobile device of the user, the displaying comprising displaying the plurality of images sequentially based on a time of capture for each image, wherein for each image of the plurality of images, a time of capture of that image is at least five seconds before or five seconds after a time of capture of the other images of the plurality of images;
        causing a display, on the mobile device, a request for a picture of a license plate of a vehicle involved in the accident;
        receiving information concerning the insurance claim comprising the picture of the license plate from the mobile device;
        performing object recognition on the received picture to determine a license plate number;
        displaying the information comprising the picture of the license plate and the license plate number on the computer;
        enabling the customer service representative to alter the information or request additional information be provided; and
        adding the information to a data record regarding the insurance claim in response to an indication that the customer service representative has verified the information.

2. The computer-implemented method of claim 1, wherein receiving the information includes receiving information from a camera on the mobile device.

3. The computer-implemented method of claim 2, wherein the application includes guides displayed on the user interface that indicate where the user should center a focus of the camera.

4. The computer-implemented method of claim 1, wherein the computer of the customer service representative receives information from the mobile device in response to a specific action taken with the mobile device.

5. The computer-implemented method of claim 1, wherein the computer of the customer service representative receives information from the mobile device on a periodic basis.

6. The computer-implemented method of claim 1, wherein the computer enables the customer service representative to ask the user of the mobile device to provide additional information.

7. A system, comprising:
a computer;
a memory coupled to the computer, the memory including programing instructions that cause the computer to perform operations comprising:
receiving, from a mobile device of a user, a request to start an insurance claim with respect to an accident, the mobile device including a mobile application configured to guide the user through the claim process;
in response to receiving the request, sending a push notification to the mobile device, the push notification causing the mobile application to automatically start a process of collecting information for the insurance claim;
in response to the mobile application automatically starting the process of collecting information for the insurance claim, establishing a live communications session between a computer of a customer service representative and the mobile device through the mobile application for collecting information for the insurance claim related to the accident;
during the live communications session between the computer of the customer service representative and the mobile device of the user for collecting information for the insurance claim related to the accident:
displaying, on the computer of the customer service representative, a plurality of images of the user interface of the mobile device of the user, the displaying comprising displaying the plurality of images sequentially based on a time of capture for each image, wherein for each image of the plurality of images, a time of capture of that image is at least five seconds before or five seconds after a time of capture of the other images of the plurality of images;
causing a display, on the mobile device, a request for a picture of a license plate of a vehicle involved in the accident;
receiving information concerning the insurance claim comprising the picture of the license plate from the mobile device;
performing object recognition on the received picture to determine a license plate number;
displaying the information comprising the picture of the license plate and the license plate number on the computer;
enabling the customer service representative to alter the information or request additional information be provided; and
adding the information to a data record regarding the insurance claim in response to an indication that the customer service representative has verified the information.

8. The system of claim 7, wherein receiving the information includes receiving information from a camera on the mobile device.

9. The system of claim 8, wherein the application includes guides displayed on the user interface that indicate where the user should center a focus of the camera.

10. The system of claim 7, wherein the computer of the customer service representative receives information from the mobile device in response to a specific action taken with the mobile device.

11. The system of claim 7, wherein the computer of the customer service representative receives information from the mobile device on a periodic basis.

12. The system of claim 7, wherein the computer enables the customer service representative to ask the user of the mobile device to provide additional information.

13. One or more non-transitory computer-readable media storing instructions which, when executed by at least one processor, cause the at least one processor to perform operations comprising:
receiving, from a mobile device of a user, a request to start an insurance claim, the mobile device including a mobile application configured to guide the user through the claim process;
in response to receiving the request, sending a push notification to the mobile device, the push notification causing the mobile application to automatically start a process of collecting information for the insurance claim;
in response to the mobile application automatically starting the process of collecting information for the insurance claim, establishing a live communications session between a computer of a customer service representative and the mobile device through the mobile application for collecting information for the insurance claim related to the accident;
during the live communications session between the computer of the customer service representative and the mobile device of the user for collecting information for the insurance claim related to the accident:
displaying, on the computer of the customer service representative, a plurality of images of the user interface of the mobile device of the user, the displaying comprising displaying the plurality of images sequentially based on a time of capture for each image, wherein for each image of the plurality of images, a time of capture of that image is at least five seconds before or five seconds after a time of capture of the other images of the plurality of images;
causing a display, on the mobile device, a request for a picture of a license plate of a vehicle involved in the accident;
receiving information concerning the insurance claim comprising the picture of the license plate from the mobile device;
performing object recognition on the received picture to determine a license plate number;
displaying the information comprising the picture of the license plate and the license plate number on the computer;

enabling the customer service representative to alter the information or request additional information be provided; and adding the information to a data record regarding the insurance claim in response to an indication that the customer service representative has verified the information.

14. The one or more computer media of claim 13, wherein receiving the information includes receiving information from a camera on the mobile device.

15. The one or more computer media of claim 14, wherein the application includes guides displayed on the user interface that indicate where the user should center a focus of the camera.

16. The one or more computer media of claim 13, wherein the computer of the customer service representative receives information from the mobile device in response to a specific action taken with the mobile device.

17. The one or more computer media of claim 13, wherein the computer of the customer service representative receives information from the mobile device on a periodic basis.

18. The one or more computer media of claim 13, wherein the computer enables the customer service representative to ask the user of the mobile device to provide additional information.

* * * * *